Patented Apr. 24, 1951

2,550,182

UNITED STATES PATENT OFFICE 2,550,182

RUBBER COMPOSITION, METHOD OF VULCANIZING SAME, AND RESULTING PRODUCT

Bernard C. Barton, Clifton, N. J., assignor to United States Rubber Company, New York, N. Y., a corporation of New Jersey No Drawing. Application June 15, 1948, Serial No. 33,232

19 Claims. (Cl. 260—793)

This invention relates to new vulcanizable mixtures and to a new method of activating the vulcanization of compositions containing rubber, sulfur as vulcanizing agent, and a reaction product of a secondary amine with carbon disulfide as vulcanization accelerator.

My invention comprises adding to the above compositions the zinc salt of 2-ethyl hexanoic acid or of naphthenic acid as the sole combined zinc activator of vulcanization.

It is an object of this invention to provide a new method of activating the cure of vulcanizable compositions containing a reaction product of an amine with carbon disulfide. It is also an object of this invention to provide new vulcanizable compositions which will not cure on standing at room temperature for considerable time, but which can be cured rapidly at moderately elevated temperature. It is a further object of this invention to provide new vulcanizable rubber cement compositions which can be stored without gelling, but which can be cured rapidly by moderate heating. A further object of this invention is to provide new tank lining compositions which can be prepared in the factory and which, after installation in the tank, can be vulcanized in situ with ease and safety.

These objects, and other objects which will be evident in the following detailed description, are accomplished, according to my invention, by employing certain zinc salts of aliphatic monocarboxylic acids, viz., zinc 2-ethyl hexanoate or zinc naphthenate as activator of vulcanization, in vulcanizable rubber compositions containing a known di-substituted ammonium dithiocarbamate ultra-accelerator.

I have found that my new compositions containing as activator zinc 2-ethyl hexanoate or zinc naphthenate, unlike prior compositions containing the conventional zinc salts of straight chain aliphatic acids, do not cure readily at room temperature, yet can be cured rapidly at elevated temperatures.

Further, I have found that this unexpected behavior is peculiar to the zinc salts of 2-ethyl hexanoic and naphthenic acids, and is not shared even by the zinc salts of other aliphatic branched-chain acids, such as zinc isobutyrate, zinc isovalerate, and zinc diethylacetate, none of which are operative in the present invention since they activate the cure at room temperature (25° C.) at least as readily as conventional zinc activators.

In general, in carrying out my invention, a vulcanizable rubber is compounded by any known means with a quantity of sulfur as a vulcanizing agent, a vulcanization accelerator consisting either of a di-substituted amine and carbon disulfide, or of a reaction product of a di-substituted amine and carbon disulfide, i. e., a di-substituted ammonium dithiocarbamate accelerator, together with the zinc salt of 2-ethyl hexanoic acid or of naphthenic acid as activator of vulcanization.

My compositions are particularly useful for applications wherein it is desirable to be able to store or handle the readily vulcanizable mixture for several days without spoilage of the mixture by premature vulcanization. Such applications include the lining of tanks, in which case, according to the present invention, the vulcanizable mixture may be prepared in the factory, and later applied to the tank walls and vulcanized in situ at a moderately elevated temperature.

My process offers considerable advantage over the conventional method of lining tanks, which involves preparing a rubber compound containing sulfur, an amine, and a conventional activator such as zinc stearate, omitting the carbon disulfide so that the mixture will not vulcanize before the lining is applied to the tank, and, after the installation of the lining on the tank walls is complete, treating the rubber with carbon disulfide to form a high-powered accelerator in the rubber. The excess carbon disulfide is removed, and then vulcanization is carried out, usually at temperatures around 120° to 180° F. The treatment of rubber in the tank with carbon disulfide is dangerous because of the fire and explosion hazard, and is inconvenient and difficult to control. Also, the treatment must be carried out at temperatures at which the carbon disulfide will readily vaporize and diffuse into the rubber, e. g., around 70° to 80° F., so that the lining of large outdoor tanks in the winter, or of submarine tanks, presents great difficulties.

In my process the treatment of the rubber with carbon disulfide may be carried out in the factory easily and conveniently, after which the lining may be shipped to the site of the tank and applied without fear of the compound curing before the construction of the lining is finished. The vulcanizable mixture will remain uncured at room temperature for from two days to three weeks or more, depending on the particular accelerator and activator employed. The lining may be vulcanized in the usual manner at elevated temperatures, e. g., 170°–120° F. for 1–16 hours, or in a shorter time at higher temperatures.

My compositions are also particularly useful for preparing rubber cements which will not gel readily at room temperature, so that it is unnecessary to prepare fresh cement daily, as with conventional formulations.

In general, in carrying out my invention for the purpose of making an improved rubber cement, the rubber is first broken down by milling until it is very soft or in a semi-liquid state. Sulfur, and a di-substituted ammonium dithiocarbamate accelerator, usually in the form of an amine and carbon disulfide added as separate materials, and zinc 2-ethyl hexanoate or zinc naphthenate, which are soluble in the common rubber solvents, may then be incorporated in the rubber at room temperature along with a volatile organic solvent conventionally used in preparing cements, such as gasoline, solvent naphtha, or xylene. If desired, the amine and the carbon disulfide may be mixed with separate portions of the rubber composition, and combined later.

It will be found that rubber cements prepared in this manner, and containing the zinc salt of 2-ethyl hexanoic acid or of naphthenic acid, are stable at room temperatures over a relatively long period of time, e. g., nine weeks or more, yet they can be cured rapidly at elevated temperatures, e. g., in 10 to 20 minutes at 230° F. In contrast to this, similarly prepared cements containing zinc salts of straight chain aliphatic acids such as zinc propionate, zinc stearate or zinc laurate, or zinc oxide plus the free straight chain acid, as activators of vulcanization, are unstable at room temperature and are found to be completely gelled or cured after three weeks' storage in closed containers.

The zinc salt of naphthenic acid which is employed in this invention is the zinc salt of the naphthenic acid of commerce, which is really a mixture of the various so-called naphthenic acids occurring in petroleum oil. Various methods in use for obtaining the commercial naphthenic acid mixture are described in "The Science of Petroleum," volume II, pages 1,007 ff., by A. E. Dunstan et al., published by Oxford University Press in 1938. The entire constitution of this naphthenic acid mixture is not definitely known, but it has been shown to contain at least three classes of acids which differ in the proportion of hydrogen they contain: those with composition $C_nH_{2n}O_2$ are paraffin carboxylic acids having 6 to 7 carbon atoms and constitute the lower boiling portion; those with composition $C_nH_{2n-2}O_2$ are monocyclic and contain 8 to 12 carbon atoms; and those with composition $C_nH_{2n-4}O_2$ are bicyclic and contain up to 22 or 23 carbon atoms. One of the simplest acids in the mixture is 1-methylcyclopentane carboxylic acid. The separation of these various naphthenic acids from the commercial mixture is very difficult and is unnecessary for the practice of this invention, since the commercial zinc naphthenate is highly effective and economical.

It should be noted that my compositions must be substantially free of zinc oxide, which would prematurely activate the accelerator.

The vulcanization accelerators employed in this invention can be any of the recognized di-substituted ammonium dithiocarbamate ultra-rapid accelerators formed by the reaction of secondary amines with carbon disulfide. A method of preparing these dithiocarbamate accelerators is described in U. S. Patent 1,463,794 of S. M. Cadwell. Suitable amines which can be used in preparing the ultra-accelerators include dimethylamine, diethylamine, dipropylamine, dibutylamine, and diamyl amines, dioctylamine, didodecylamine, piperidine, dibenzylamine, and other amines having one replaceable ammoniacal hydrogen, such accelerators being well known in the industry. As specific examples of such accelerators may be mentioned dibutylammonium dibutyldithiocarbamate, dioctylammonium dioctyldithiocarbamate, diisoamylammonium diisoamyldithiocarbamate, piperidinium pentamethylene dithiocarbamate and dibenzylammonium dibenzyldithiocarbamate. The dibutyl-, diisoamyl-, and dibenzyl-ammonium compounds are preferred.

As is well known, the accelerator may be prepared outside the rubber, or may be formed inside the rubber by incorporating the amine and carbon disulfide in the rubber mix in various ways.

The proportions of sulfur, accelerator, and metal salt activator to be employed for any particular application according to this invention, are the same as the proportions commonly used and well known in the rubber compounding art. It may be mentioned by way of non-limiting illustration that from 0.5 to 5.0 parts (by weight) of sulfur, 0.5 to 5.0 parts of accelerator, and 1.0 to 10 parts of activator are generally employed per 100 parts of rubber.

Various fillers and other modifying ingredients which will not cause premature activation may be used if desired.

Following are examples of the invention. Parts are by weight.

*Example 1*

The following masterbatch was prepared in a rubber mill:

| | Parts |
|---|---|
| Pale crepe | 100 |
| Sulfur | 3 |
| Dioctylamine | 2 |

Portions of this mix were compounded with various activators as shown in the table below. The sheeted stocks were treated at room temperature with 2% of carbon disulfide on the weight of the stock in a closed container. The durometer hardness of the stocks given in the table shows the relative state of cure after standing various times at room temperature and after heating various times at 135° F. It is observed that stocks Nos. 1, 2 and 3, activated with zinc oxide, zinc laurate or zinc propionate, cured readily at room temperature, while stocks Nos. 4 and 5 prepared with the activators of this invention were stable for long periods at room temperature; the latter cured rapidly at elevated temperature, e. g., in ten minutes in boiling water.

Repetition of this example using zinc salts of other branched-chain aliphatic acids, viz., zinc isobutyrate, zinc isovalerate, and zinc diethylacetate, gave stocks which cured readily at room temperature, unlike the stocks made with the activators of this invention.

| | Mix 1 | 2 | 3 | 4 | 5 |
|---|---|---|---|---|---|
| Ingredients: | | | | | |
| Masterbatch | 105 | 105 | 105 | 105 | 105. |
| Zinc oxide | 1.0 | | | | |
| Zinc laurate | | 7.2 | | | |
| Zinc propionate | | | 3.2 | | |
| Zinc ethyl hexanoate | | | | 5.0 | |
| Zinc naphthenate | | | | | 8.0. |
| Durometer hardness after standing at room temperature for— | | | | | |
| 10 hours | no cure | 20 | 23 | no cure | no cure. |
| 2 days | 15 | 26 | 32 | do | Do. |
| 4 days | 20 | 31 | 36 | do | Do. |
| 7 days | 33 | 34 | 39 | very slight cure. | Do. |
| 10 days | 35 | 36 | 41 | 18 | Do. |
| 14 days | 40 | 38 | 42 | 35 | Do. |
| 24 days | 43 | 40 | 43 | 43 | Do. |
| 35 days | | | | | 25. |
| Durometer hardness after curing at 135° F. for— | | | | | |
| ½ hour | no cure | 23 | 24 | no cure | Do. |
| 1 hour | 15 | 27 | 29 | do | Do. |
| 1½ hours | 20 | 30 | 34 | do | Do. |
| 2 hours | 21 | 32 | 35 | do | Do. |
| 2½ hours | 23 | 34 | 37 | 17 | Do. |
| 3½ hours | 27 | 35 | 38 | 20 | Do. |
| 5 hours | 28 | 36 | 39 | 28 | Do. |
| 7 hours | 33 | 38 | 40 | 38 | 38. |
| 24 hours | 38 | 40 | 43 | 43 | 44. |

*Example 2*

Five percent rubber cements in gasoline, of composition indicated in the table below, were prepared by milling pale crepe rubber to a semi-liquid state and then mixing in the solvent and other ingredients at room temperature. Referring to the table, accelerator A is dioctylammonium dioctyldithiocarbamate; accelerator B is dibutylammonium dibutyldithiocarbamate; accelerator C is dibenzylammonium dibenzyldithiocarbamate; accelerator D is diisoamylammonium diisoamyldithiocarbamate. The zinc salts of naphthenic and 2-ethyl hexanoic acid were prepared by heating equivalent quantities of zinc oxide and the acids in benzene and distilling off the water formed. The benzene was then evaporated, leaving the zinc salt. The table shows the original relative viscosity of the cements, and the relative viscosities after various periods of storage in closed containers at room temperature. The relative viscosities were determined in a modified Ostwald-Fenske flow type viscometer.

The table also shows the tensile strength of films cured for various times, prepared from the cement after the cement was stored two weeks at room temperature.

zinc salt of a straight chain acid as activator is unstable at room temperature.

From the foregoing, it is evident that my new method of activating the cure of vulcanizable rubber compositions has many advantages over known methods of activation. In employing my compositions for lining tanks, the inconvenience and hazards associated with treating the lining with carbon disulfide in the tank are avoided. In employing my compositions in rubber cements, the inconvenience of making up fresh cement daily, and the waste resulting from gelling of the cement, are avoided.

Zinc naphthenate and zinc 2-ethyl hexanoate are both oil-soluble materials, unlike conventional zinc salt activators derived from straight chain aliphatic acids. This property facilitates the preparation of rubber cements in organic solvents.

Having thus described my invention what I claim and desire to protect by Letters Patent is:

1. An improved vulcanizable composition comprising rubber, sulfur as vulcanizing agent, a dithiocarbamate accelerator selected from the class consisting of dialkyl ammonium N,N-dialkyl dithiocarbamates wherein each alkyl group con-

| | 1 (Control) | 2 | 3 | 4 | 5 | 6 | 7 | 8 | 9 |
|---|---|---|---|---|---|---|---|---|---|
| Ingredients, Parts: | | | | | | | | | |
| Pale crepe | 100 | 100 | 100 | 100 | 100 | 100 | 100 | 100 | 100 |
| Sulfur | 2 | 2 | 2 | 2 | 2 | 2 | 2 | 2 | 2 |
| Accelerator A | | 2 | | | | 2 | | | |
| Accelerator B | | | 2 | | | | 2 | | |
| Accelerator C | | | | 2 | | | | 2 | |
| Accelerator D | | | | | 2 | | | | 2 |
| Zinc laurate | 5 | | | | | | | | |
| Zinc naphthenate | | 5 | 5 | 5 | 5 | | | | |
| Zinc 2-ethyl hexanoate | | | | | | 5 | 5 | 5 | 5 |
| Relative Viscosity, flow time for 5 cc., seconds: | | | | | | | | | |
| When prepared | 30 | 29 | 28 | 30 | 29 | 36 | 30 | 33 | 30 |
| After 1 week | 110 | 22 | 20 | 23 | 20 | 32 | 29 | 31 | 31 |
| After 3 weeks | gelled | 18 | 15 | 19 | 15 | 36 | 28 | 30 | 31 |
| After 9 weeks | | 10 | 9 | 10 | 10 | 40 | 30 | 16 | 19 |
| Tensile strength of film (p. s. i.) after curing: | | | | | | | | | |
| 10 minutes at 5# steam | 3,200 | 1,500 | 2,500 | 1,500 | 1,500 | 4,100 | 4,000 | 2,500 | 3,500 |
| 20 minutes at 5# steam | 3,200 | 2,500 | 2,300 | 2,500 | 2,500 | 4,100 | 3,600 | 4,000 | 3,400 |
| 40 minutes at 5# steam | 3,200 | 3,000 | 1,700 | 2,500 | 2,500 | 2,800 | 2,900 | 3,300 | 3,000 |

These results show that the cements containing zinc salts of this invention as activators are stable for a relatively long time at room temperature, but can be readily cured at elevated temperature, while the cement containing the tains from 1 to 12 carbon atoms and dibenzyl ammonium N,N-dibenzyl dithiocarbamate, and, as the sole combined zinc activator therefore a zinc salt of an aliphatic monocarboxylic acid selected from the group consisting of zinc 2-ethyl hexanoate and zinc naphthenate in amount effective to activate vulcanization of the composition.

2. A composition as in claim 1, in which the activator is zinc 2-ethyl hexanoate.

3. A composition as in claim 1, in which the activator is zinc naphthenate.

4. An improved rubber cement comprising rubber, sulfur, a dithiocarbamate accelerator selected from the class consisting of dialkyl ammonium N,N-dialkyl dithiocarbamates wherein each alkyl group contains from 1 to 12 carbon atoms and dibenzyl ammonium N,N-dibenzyl dithiocarbamate, a zinc salt of an aliphatic monocarboxylic acid selected from the group consisting of zinc 2-ethyl hexanoate and zinc naphthenate in amount effective to activate vulcanization, the said zinc salt being the sole combined zinc activator present, and a volatile organic solvent for the rubber.

5. A composition comprising rubber, sulfur, a zinc salt of an aliphatic monocarboxylic acid selected from the group consisting of zinc 2-ethyl hexanoate and zinc naphthenate in amount effective to activate the vulcanization of the composition, the said zinc salt being the sole combined zinc activator present, and dibutylammonium dibutyldithiocarbamate as accelerator.

6. A composition comprising rubber, sulfur, a zinc salt of an aliphatic monocarboxylic acid selected from the group consisting of zinc 2-ethyl hexanoate and zinc naphthenate in amount effective to activate vulcanization, the said zinc salt being the sole combined zinc activator present, and diisoamylammonium diisoamyldithiocarbamate as accelerator.

7. A composition comprising rubber, sulfur, a zinc salt of an aliphatic monocarboxylic acid selected from the group consisting of zinc 2-ethyl hexanoate and zinc naphthenate in amount effective to activate vulcanization, the said zinc salt being the sole combined zinc activator present, and dibenzylammonium dibenzyldithiocarbamate as accelerator.

8. The method of vulcanizing rubber which comprises incorporating a zinc salt of an aliphatic monocarboxylic acid selected from the group consisting of zinc 2-ethyl hexanoate and zinc naphthenate in amount effective to activate vulcanization in a composition of rubber, sulfur as vulcanizing agent, a dithiocarbamate accelerator selected from the class consisting of dialkyl ammonium N,N-dialkyl dithiocarbamates wherein each alkyl group contains from 1 to 12 carbon atoms and dibenzyl ammonium N,N-dibenzyl dithiocarbamate, and subjecting to vulcanizing conditions, the said zinc salt being the sole combined zinc activator present.

9. The method of vulcanizing rubber which comprises incorporating a zinc salt of an aliphatic monocarboxylic acid selected from the group consisting of zinc 2-ethyl hexanoate and zinc naphthenate in amount effective to activate vulcanization in a composition of rubber, sulfur, and a secondary amine selected from the class consisting of the dialkyl secondary amines wherein each alkyl substituent has from 1 to 12 carbon atoms and dibenzyl amine and treating the composition with carbon disulfide to form a dithiocarbamate accelerator of vulcanization in the rubber, and subjecting the composition to vulcanizing conditions, the said zinc salt being the sole combined zinc activator present.

10. The method of vulcanizing rubber which comprises incorporating a zinc salt of an aliphatic monocarboxylic acid selected from the group consisting of zinc 2-ethyl hexanoate and zinc naphthenate in amount effective to activate vulcanization in a composition of rubber, sulfur and dibutylammonium dibutyldithiocarbamate and subjecting to vulcanizing conditions, the said zinc salt being the sole combined zinc activator present.

11. The method of vulcanizing rubber which comprises incorporating a zinc salt of an aliphatic moncoarboxylic acid selected from the group consisting of zinc 2-ethyl hexanoate and zinc naphthenate in amount effective to activate vulcanization in a composition of rubber, sulfur, and dibutyl amine and treating the composition with carbon disulfide to form a dithiocarbamate accelerator of vulcanization in the rubber, and subjecting the composition to vulcanizing conditions, the said zinc salt being the sole combined zinc activator present.

12. The method of vulcanizing rubber which comprises incorporating a zinc salt of an aliphatic monocarboxylic acid selected from the group consisting of zinc 2-ethyl hexanoate and zinc naphthenate in amount effective to activate vulcanization in a composition of rubber, sulfur and diisoamylammonium diisoamyldithiocarbamate and subjecting to vulcanizing conditions, the said zinc salt being the sole combined zinc activator present.

13. The method of vulcanizing rubber which comprises incorporating a zinc salt of an aliphatic monocarboxylic acid selected from the group consisting of zinc 2-ethyl hexanoate and zinc naphthenate in amount effective to activate vulcanization in a composition of rubber, sulfur, and diisoamyl amine and treating the composition with carbon disulfide to form a dithiocarbamate accelerator of vulcanization in the rubber, and subjecting the composition to vulcanizing conditions, the said zinc salt being the sole combined zinc activator present.

14. The method of vulcanizing rubber which comprises incorporating a zinc salt of an aliphatic monocarboxylic acid selected from the group consisting of zinc 2-ethyl hexanoate and zinc naphthenate in amount effective to activate vulcanization in a composition of rubber, sulfur and dibenzylammonium dibenzyldithiocarbamate and subjecting to vulcanizing conditions, the said zinc salt being the sole combined zinc activator present.

15. The method of vulcanizing rubber which comprises incorporating a zinc salt of an aliphatic monocarboxylic acid selected from the group consisting of zinc 2-ethyl hexanoate and zinc naphthenate in amount effective to activate vulcanization in a composition of rubber, sulfur, and dibenzyl amine and treating the composition with carbon disulfide to form a dithiocarbamate accelerator of vulcanization in the rubber, and subjecting the composition to vulcanizing conditions, the said zinc salt being the sole combined zinc activator present.

16. A vulcanized rubber product derived from a composition of rubber, sulfur as vulcanizing agent, a dithiocarbamate accelerator selected from the class consisting of dialkyl ammonium N,N-dialkyl dithiocarbamates wherein each alkyl group contains from 1 to 12 carbon atoms and dibenzyl ammonium N,N-dibenzyl dithiocarbamate, and a zinc salt of an aliphatic monocarboxylic acid selected from the group consisting of zinc 2-ethyl hexanoate and zinc naphthenate in amount effective to activate vulcanization, the said zinc salt being the sole combined zinc activator present.

17. A vulcanized rubber product derived from a composition of rubber, sulfur as vulcanizing agent, dibutylammonium dibutyldithiocarbamate as accelerator, and a zinc salt of an aliphatic monocarboxylic acid selected from the group consisting of zinc 2-ethyl hexanoate and zinc naphthenate in amount effective to activate vulcanization, the said zinc salt being the sole combined zinc activator present.

18. A vulcanized rubber product derived from a composition of rubber, sulfur as vulcanizing agent, diisoamylammonium diisoamyldithiocarbamate as accelerator, and a zinc salt of an aliphatic monocarboxylic acid selected from the group consisting of zinc 2-ethyl hexanoate and zinc naphthenate in amount effective to activate vulcanization, the said zinc salt being the sole combined zinc activator present.

19. A vulcanized rubber product derived from a composition of rubber, sulfur as vulcanizing agent, dibenzylammonium dibenzyldithiocarbamate as accelerator, and a zinc salt of an aliphatic monocarboxylic acid selected from the group consisting of zinc 2-ethyl hexanoate and zinc naphthenate in amount effective to activate vulcanization, the said zinc salt being the sole combined zinc activator present.

BERNARD C. BARTON.

REFERENCES CITED

The following references are of record in the file of this patent:

UNITED STATES PATENTS

| Number | Name | Date |
| --- | --- | --- |
| 1,436,894 | Murrill | Nov. 28, 1922 |
| 1,815,778 | Kinney | July 21, 1931 |
| 2,301,142 | Roon et al. | Nov. 3, 1942 |
| 2,326,555 | Neal et al. | Aug. 10, 1943 |

FOREIGN PATENTS

| Number | Country | Date |
| --- | --- | --- |
| 574,052 | Great Britain | Dec. 19, 1945 |